(12) United States Patent
Gobara et al.

(10) Patent No.: US 10,120,081 B2
(45) Date of Patent: Nov. 6, 2018

(54) SELECTION METHOD, POSITIONING DEVICE AND PROGRAM

(71) Applicant: Seiko Epson Corporation, Tokyo (JP)

(72) Inventors: Naoki Gobara, Shiojiri (JP); Naganobu Aoki, Togo (JP)

(73) Assignee: Seiko Epson Corporation (JP)

( * ) Notice: Subject to any disclaimer, the term of this patent is extended or adjusted under 35 U.S.C. 154(b) by 284 days.

(21) Appl. No.: 15/010,035

(22) Filed: Jan. 29, 2016

(65) Prior Publication Data

US 2016/0223680 A1  Aug. 4, 2016

(30) Foreign Application Priority Data

Jan. 30, 2015 (JP) ................................ 2015-016562

(51) Int. Cl.
| | | |
|---|---|---|
| *G01S 19/34* | (2010.01) | |
| *G01S 19/28* | (2010.01) | |
| *G01S 19/05* | (2010.01) | |
| *G01S 19/42* | (2010.01) | |
| *G01S 19/33* | (2010.01) | |

(52) U.S. Cl.
CPC .............. *G01S 19/34* (2013.01); *G01S 19/05* (2013.01); *G01S 19/28* (2013.01); *G01S 19/423* (2013.01); *G01S 19/33* (2013.01)

(58) Field of Classification Search
CPC ........ G01S 19/05; G01S 19/06; G01S 19/252; G01S 19/258; G01S 19/28; G01S 19/33; G01S 19/423; G01S 19/48
See application file for complete search history.

(56) References Cited

U.S. PATENT DOCUMENTS

| | | | | |
|---|---|---|---|---|
| 6,768,909 | B1* | 7/2004 | Irvin ....................... | G01S 19/48 455/456.1 |
| 7,646,338 | B2* | 1/2010 | Monnerat ............... | G01S 19/06 342/357.66 |
| 2002/0019698 | A1* | 2/2002 | Vilppula .................. | G01S 19/48 702/150 |
| 2006/0187116 | A1 | 8/2006 | Uozumi | |
| 2007/0159388 | A1* | 7/2007 | Allison .................... | G01S 19/05 342/357.29 |
| 2007/0236387 | A1 | 10/2007 | Monnerat | |
| 2011/0032859 | A1* | 2/2011 | Wirola ..................... | G01S 19/05 370/312 |
| 2011/0181465 | A1 | 7/2011 | Li et al. | |

(Continued)

FOREIGN PATENT DOCUMENTS

| | | |
|---|---|---|
| JP | H01-276084 A | 11/1989 |
| JP | H10-031061 A | 2/1998 |

(Continued)

*Primary Examiner* — Bernarr E Gregory
*Assistant Examiner* — Fred H Mull
(74) *Attorney, Agent, or Firm* — Harness, Dickey & Pierce, P.L.C.

(57) ABSTRACT

A method of selecting a satellite positioning system which is used in positioning by a positioning device capable of performing positioning based on a plurality of satellite positioning systems includes acquiring given support information which is referred to in selecting a satellite positioning system, and selecting a satellite positioning system which is used in positioning from the plurality of satellite positioning systems, on the basis of the support information.

12 Claims, 12 Drawing Sheets

[ORDER OF PRIORITY: LOW REMAINING BATTERY LEVEL]

| COMBINATION OF SATELLITE POSITIONING SYSTEMS | NUMBER OF SATELLITES CAPTURED | ORDER OF PRIORITY |
|---|---|---|
| ONLY FIRST | 10 | 1 |
| ONLY SECOND | 8 | 2 |
| ONLY THIRD | 6 | 5 |
| FIRST + SECOND | 18 | 3 |
| FIRST + THIRD | 16 | 4 |

(56) References Cited

U.S. PATENT DOCUMENTS

| | | | | |
|---|---|---|---|---|
| 2012/0075144 A1* | 3/2012 | Diggelen | ............... | G01S 19/28 |
| | | | | 342/357.66 |
| 2013/0002478 A1* | 1/2013 | Jarvis | ................... | G01S 19/252 |
| | | | | 342/357.25 |
| 2013/0162468 A1* | 6/2013 | Kim | ....................... | G01S 19/28 |
| | | | | 342/357.25 |
| 2015/0301187 A1* | 10/2015 | Lee | ....................... | G01S 19/423 |
| | | | | 342/357.67 |
| 2016/0061956 A1* | 3/2016 | Savoy, Jr. | ............... | G01S 19/28 |
| | | | | 342/357.4 |

FOREIGN PATENT DOCUMENTS

| | | |
|---|---|---|
| JP | 2003-043127 A | 2/2003 |
| JP | 2006-214932 A | 8/2006 |
| JP | 2010-014565 A | 1/2010 |
| JP | 2013-51824 A | 5/2013 |
| JP | 2014-219204 A | 11/2014 |
| WO | WO-2011-093964 A1 | 8/2011 |

\* cited by examiner

[NUMBER OF SATELLITES CAPTURED]

| SATELLITE POSITIONING SYSTEM | NUMBER OF SATELLITES CAPTURED |
|---|---|
| FIRST SATELLITE POSITIONING SYSTEM | 10 |
| SECOND SATELLITE POSITIONING SYSTEM | 8 |
| THIRD SATELLITE POSITIONING SYSTEM | 6 |

FIG. 8A

[ORDER OF PRIORITY: HIGH REMAINING BATTERY LEVEL]

| COMBINATION OF SATELLITE POSITIONING SYSTEMS | NUMBER OF SATELLITES CAPTURED | ORDER OF PRIORITY |
|---|---|---|
| ONLY FIRST | 10 | 3 |
| ONLY SECOND | 8 | 4 |
| ONLY THIRD | 6 | 5 |
| FIRST + SECOND | 18 | 1 |
| FIRST + THIRD | 16 | 2 |

FIG. 8B

[ORDER OF PRIORITY: LOW REMAINING BATTERY LEVEL]

| COMBINATION OF SATELLITE POSITIONING SYSTEMS | NUMBER OF SATELLITES CAPTURED | ORDER OF PRIORITY |
|---|---|---|
| ONLY FIRST | 10 | 1 |
| ONLY SECOND | 8 | 2 |
| ONLY THIRD | 6 | 5 |
| FIRST + SECOND | 18 | 3 |
| FIRST + THIRD | 16 | 4 |

FIG. 8C

SELECTION METHOD, POSITIONING DEVICE AND PROGRAM

CROSS-REFERENCE

The entire disclosure of Japanese Patent Application No. 2015-016562, filed Jan. 30, 2015 is hereby expressly incorporated by reference herein.

BACKGROUND

1. Technical Field

The present disclosure relates to a method of selecting a satellite positioning system used in positioning, and the like.

2. Related Art

At present, a plurality of satellite positioning systems such as a global positioning system (GPS), a quasi zenith satellite system (QZSS), a global navigation satellite system (GLONASS), a BeiDou navigation satellite system, and Galileo have been known.

In addition, in recent years, the development of a so-called multi global navigation satellite system (GNSS) correspondence receiver (hereinafter, simply referred to as a "multi-receiver") which is a positioning device capable of performing positioning based on a plurality of satellite positioning systems has been progressing. Satellite positioning systems are in operation on the basis of their proprietary specifications, respectively, and are carrier frequencies, codes and the like different from each other. For this reason, in a multi-receiver, it is normal that a receiver corresponding to each satellite positioning system is configured to be mounted. As a technique of the multi-receiver, a technique has been known in which a plurality of satellite positioning systems are used, to thereby increase the number of positioning satellites capable of being captured and improve the accuracy of positioning (see, for example, JP-A-2010-14565).

Incidentally, the satellite positioning system includes a satellite positioning system in which the whole area on the earth is set to a coverage area, and a satellite positioning system in which only some of countries or regions are set to a coverage area as well. That is, there are a satellite positioning system capable of positioning and a satellite positioning system incapable of positioning depending on locations. For this reason, in positioning based on the multi-receiver, it is necessary to rapidly determine a satellite positioning system capable of positioning. For example, a method of searching for only satellite positioning systems which are set in advance, a method of searching for all available satellite positioning systems in order, and the like are considered. However, in the former method, the satellite positioning systems which are set are not necessarily capable of positioning. In addition, in the latter method, there is the possibility of all the satellite positioning systems being searched for depending on the order of search, which leads to considerable inefficiency.

SUMMARY

An advantage of some aspects of the present disclosure is to make it possible to perform positioning by selecting an appropriate satellite positioning system in a positioning device capable of using a plurality of satellite positioning systems.

A first aspect of the present disclosure is directed to a method of selecting a satellite positioning system which is used in positioning by a positioning device capable of performing positioning based on a plurality of satellite positioning systems, the method including: acquiring given support information which is reference information for selecting a satellite positioning system; and selecting a satellite positioning system which is used in positioning from the plurality of satellite positioning systems, on the basis of the support information.

As another aspect, the present disclosure may be configured as a positioning device capable of performing positioning based on a plurality of satellite positioning systems, the device including: an acquisition unit that acquires given support information which is reference information for selecting a satellite positioning system; and a selector that selects a satellite positioning system which is used in positioning from the plurality of satellite positioning systems, on the basis of the support information.

As still another aspect, the present disclosure may be configured as a program causing a computer capable of performing positioning based on a plurality of satellite positioning systems to execute: acquiring given support information which is reference information for selecting a satellite positioning system; and selecting a satellite positioning system which is used in positioning from the plurality of satellite positioning systems, on the basis of the support information.

According to the first aspect and the like, reference support information for selecting a satellite positioning system is acquired, and a satellite positioning system used in positioning is selected from a plurality of satellite positioning systems, on the basis of the acquired support information. Thereby, it is possible to perform positioning by rapidly selecting an appropriate satellite positioning system from the plurality of satellite positioning systems.

As a second aspect, the selection method of the first aspect may be configured such that information of a location at which the positioning device is located is at least included in the support information, and the selecting includes selecting a satellite positioning system which is previously associated as a satellite positioning system available for positioning at position indicated by the location information.

According to the second aspect, information of a location at which the positioning device is located may be at least included in the support information, and a satellite positioning system which is previously associated as a satellite positioning system available for positioning is selected at a position indicated by the location information included in the support information. Thereby, it is possible to rapidly select an available satellite positioning system at the position of the positioning device.

As a third aspect, the selection method of the second aspect may be configured such that the acquiring is acquiring the support information including the location information from an external device capable of communication with the positioning device through near field communication.

According to the third aspect, the support information including the location information is acquired from the external device capable of communication with the positioning device through near field communication. Thereby, for example, the location information indicating the position of a surrounding external device can be acquired in a state of being regarded as the location information indicating the position of the positioning device.

As a fourth aspect, the selection method of the first or second aspect may be configured such that the acquiring is performing communication with an external device capable of performing positioning based on the plurality of satellite positioning systems, and acquiring positioning collateral information when the external device performs a positioning process, as the support information.

According to the fourth aspect, positioning collateral information when the external device capable of performing positioning based on the plurality of satellite positioning systems performs a positioning process is acquired as the support information. Thereby, for example, a satellite positioning system used in positioning by the external device is selected, and thus it is possible to rapidly select an appropriate satellite positioning system.

As a fifth aspect, the selection method of the fourth aspect may be configured such that the positioning collateral information includes at least one of identification information of a satellite positioning system used by the external device, the number of satellites according to a satellite positioning system captured by the external device, identification information of a satellite captured by the external device, and orbit information of the satellite captured by the external device.

According to the fifth aspect, the positioning collateral information includes at least one of identification information of a satellite positioning system used by the external device, the number of satellites according to a captured satellite positioning system, identification information of a satellite, and orbit information of the satellite. Thereby, for example, the satellite positioning system used by the external device can be selected as a satellite positioning system which is used in positioning by the positioning device. In addition, the positioning satellite captured by the external device during positioning is used as a search target by the positioning device, and thus it is possible to efficiently search for a positioning satellite.

As a sixth aspect, the selection method of the fourth or fifth aspect may be configured such that the selecting includes setting an order of priority of the satellite positioning systems that make an attempt at positioning, on the basis of the positioning collateral information.

According to the sixth aspect, the order of priority of the satellite positioning systems that make an attempt at positioning is set on the basis of the positioning collateral information. The satellite positioning systems are selected in accordance with the set order of priority, and thus it is possible to perform positioning by rapidly selecting an appropriate satellite positioning system.

BRIEF DESCRIPTION OF THE DRAWINGS

The invention will be described with reference to the accompanying drawings, wherein like numbers reference like elements.

FIGS. 8A and 8C are diagrams illustrating a setting example of the order of priority in a third example.

DESCRIPTION OF EXEMPLARY EMBODIMENTS

System Configuration

Figures 1, 2:
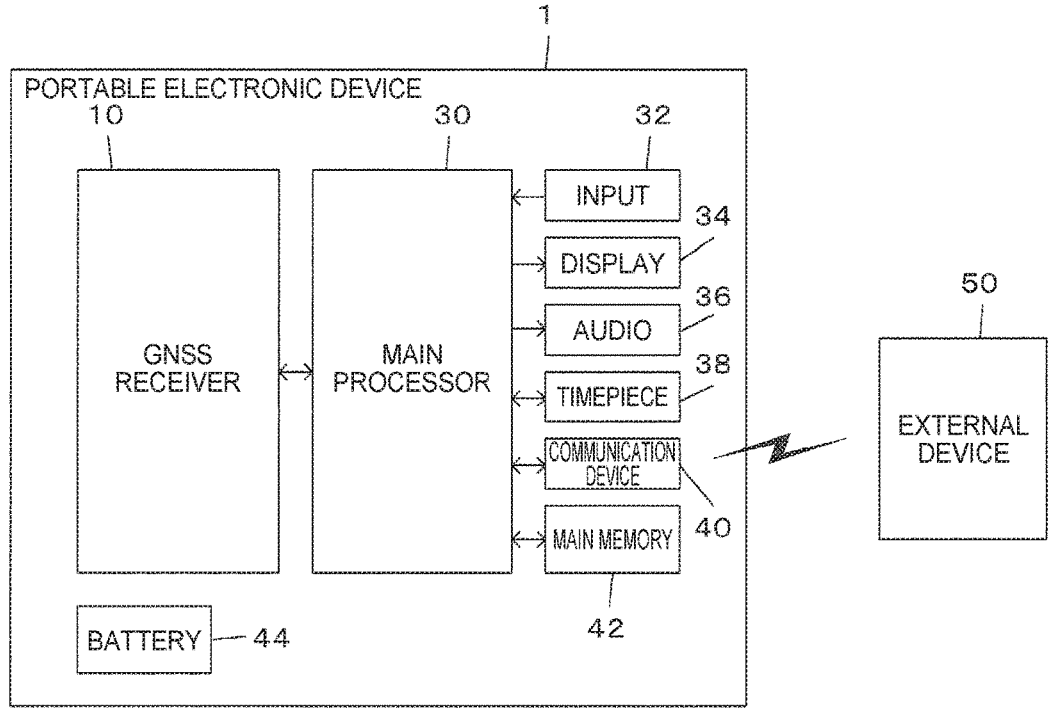
FIG. 1 is a diagram illustrating the entire configuration of a computer system of an embodiment.
FIG. 2 is a data configuration example of a region and satellite positioning system correspondence table in a first example.

FIG. 1 is the entire configuration diagram of a computer system of the present embodiment. As shown in FIG. 1, the computer system is configured to include a portable electronic device 1 and an external device 50. Data communication based on near field communication such as Bluetooth (Registered Trademark) can be performed between the portable electronic device 1 and the external device 50.

The external device 50 is an electronic device which is carried with a user, and is, for example, a cellular phone, a smartphone, a notebook-type or tablet-type computer, or the like.

The portable electronic device 1 is a small-sized electronic device which is used in a state of being carried by a user or being worn on the user's body such as the arm or the wrist, and is configured to form, for example, a watch type. In addition, the portable electronic device 1 includes a GNSS receiver 20 which is a positioning device capable of performing positioning based on a plurality of satellite positioning systems such as a GPS, a QZSS, or a GLONASS. The GNSS receiver 20 acquires support information which is reference information for selecting a satellite positioning system from the external device 50, selects a satellite positioning system which is used in positioning on the basis of the acquired support information, and performs positioning using the selected satellite positioning system. Meanwhile, the portable electronic device 1 including the GNSS receiver 20 can also be referred to a positioning device.

The portable electronic device 1 is configured to include a GNSS receiver 20, a main processor 30, an input 32, a display 34, an audio 36, a timepiece 38, a communication device 40, a battery 44, and a main memory 42.

The main processor 30 is a processing unit which is constituted by a processor such as a central processing unit (CPU), and controls each unit of the portable electronic device 1, as a whole, in accordance with various types of program such as a system program which is stored in the main memory 42.

The input 32 is an input device which is constituted by a touch panel, a button switch or the like, and outputs an operation signal according to a user's operation to the main processor 30. The display 34 is a display device which is constituted by a liquid crystal display (LCD), a touch panel or the like, and performs various types of display based on a display signal from the main processor 30. The audio 36 is an audio device which is constituted by a speaker or the like, and outputs various types of audible information based on a sound signal from the main processor 30.

The timepiece 38 is an internal clock, is constituted by an oscillation circuit including a crystal oscillator or the like, and clocks a current time, an elapsed time from a designated timing, or the like. The communication device 40 is a communication device which is constituted by a near field communication module such as Bluetooth (Registered Trademark), and performs communication with other devices such as the external device 50.

The main memory 42 is a storage device which is constituted by a read only memory (ROM), a random access memory (RAM) or the like, stores a program or data in order for the main processor 30 to realize various types of function of the portable electronic device 1, is used as the work area of the main processor 30, and temporarily stores arithmetic operation results of the main processor 30, operation data from the input 32, or the like. The battery 44 is a battery having a chargeable secondary battery, and supplies a drive power supply to each unit of the portable electronic device 1.

In the computer system configured in this manner, a description will be given of four specific examples in which the portable electronic device 1 performs positioning by acquiring support information from the external device 50. Meanwhile, a main component different from those of the portable electronic device 1 in each example is a GNSS receiver 10. Therefore, hereinafter, the GNSS receiver 10 of the portable electronic device 1 will be mainly described.

First Example

A first example is an example in which support information acquired from the external device 50 by a GNSS receiver 10A (see FIG. 3) is set to information of a location at which the GNSS receiver 20 is located. However, since a range available for a satellite positioning system is over a wide range of a country or a continent, the degrees of distances of near field communication performed between the GNSS receiver 10A and the external device 50 can be treated alike when seen from a satellite positioning system. For this reason, the GNSS receiver 10A acquires information of a location at which the external device 50 is located, inclusive of support information, as information of a location at which the GNSS receiver 10A is located.

The GNSS receiver 10A selects a satellite positioning system associated with a position indicated by the location information acquired from the external device 50, as a satellite positioning system used in positioning, for example, in accordance with a region and satellite positioning system correspondence table 304 showing an example in FIG. 2.

FIG. 2 is a diagram illustrating an example of a data configuration of the region and satellite positioning system correspondence table 304. According to FIG. 2, the region and satellite positioning system correspondence table 304 stores each satellite positioning system 304a in association with whether being available in each region 304b. In the region and satellite positioning system correspondence table 304, the GNSS receiver 10 selects the satellite positioning system 304a, associated so as to be available in the region 304b including a position indicated by the location information acquired from the external device 50, as a satellite positioning system used in positioning.

Here, in a case of, for example, a cellular phone, the location information of the external device 50 can be set to information of service areas of cellular phone communication carriers in countries or regions. Alternatively, when the external device 50 is a device capable of using a satellite positioning system, the location information can also be set to information of the proximal position obtained by positioning using a satellite positioning system.

Configuration

Figure 3:
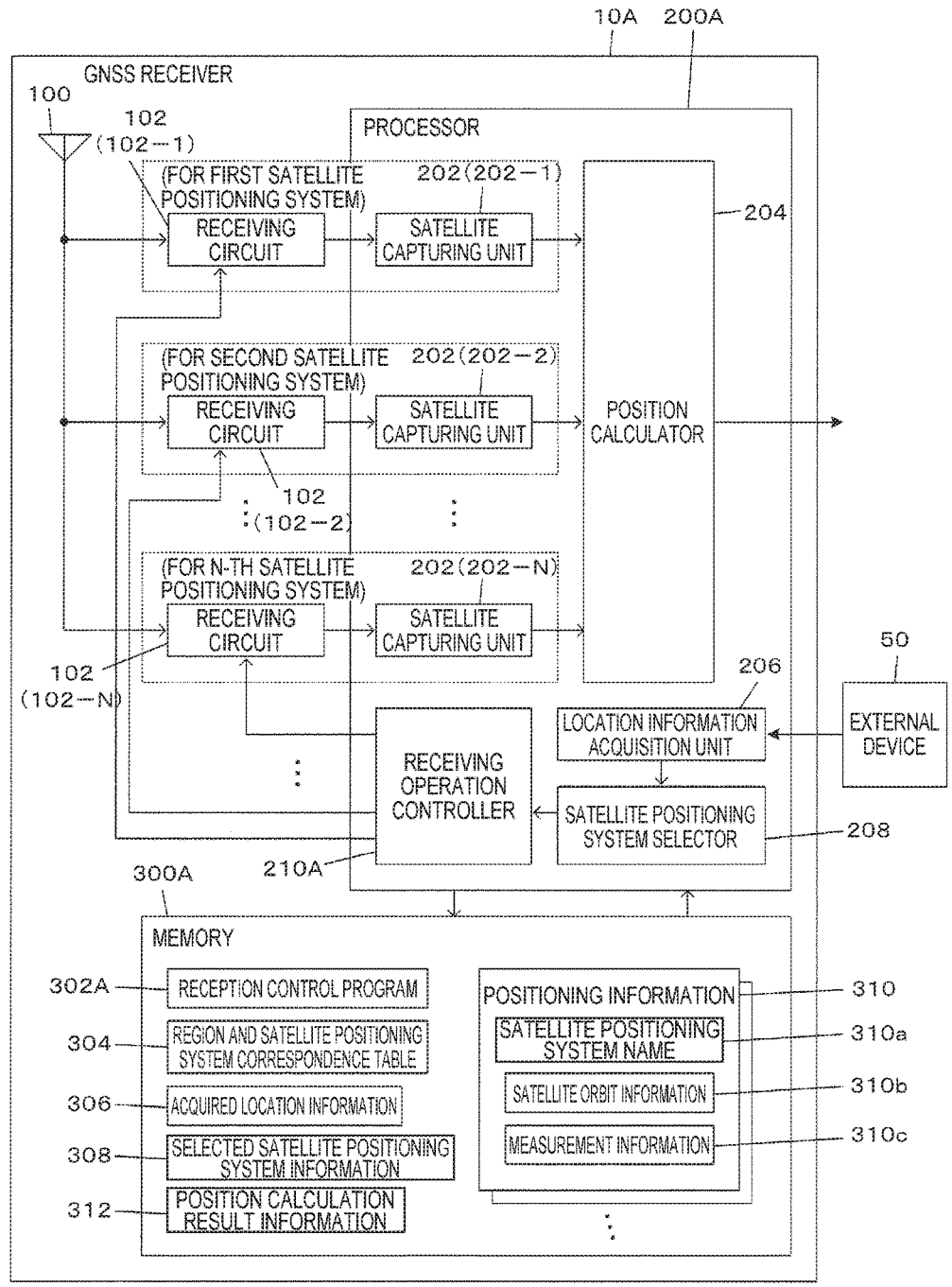
FIG. 3 is a diagram illustrating an internal configuration of a GNSS receiver in the first example.

FIG. 3 is an internal configuration diagram of the GNSS receiver 10A in the first example. As shown in FIG. 3, the GNSS receiver 10A includes a receiving antenna 100, a receiving circuit 102, a processor 200A, and a memory 300A.

The receiving antenna 100 is configured to be capable of receiving signals, each having a carrier frequency of a satellite signal corresponding to each of a plurality of satellite positioning systems which are available to the GNSS receiver 10A.

The receiving circuit 102 is constituted by N receiving circuit 102-1 to 102-N corresponding to a plurality of satellite systems, respectively, which are available to the GNSS receiver 10A. The receiving circuit 102 down-converts the signal received by the receiving antenna 100 into a signal having an intermediate frequency, performs amplification or the like on the signal, and then converts the signal into a digital signal to thereby output the resultant. Meanwhile, when a direct conversion-type circuit is used, the signal can be directly converted into a signal having a baseband frequency, and then be converted into a digital signal to thereby output the resultant.

The processor 200A is realized by a processor such as a CPU or a DSP, and controls each unit of the GNSS receiver 10A as a whole. In the first example, the processor 200A includes a satellite capturing unit 202, a position calculator 204, a location information acquisition unit 206, a satellite positioning system selector 208, and a receiving operation controller 210A.

The satellite capturing unit 202 is constituted by N satellite capturing units 202-1 to 202-N corresponding to receiving circuit 102-1 to 102-N, respectively. The satellite capturing unit 202 captures a positioning satellite (satellite signal) by performing digital signal processing such as carrier (carrier wave) removal, a correlation arithmetic operation or the like on data of a received signal based on a corresponding receiving circuit 102, and acquires satellite orbit information 310b or measurement information 310c with respect to each captured positioning satellite.

The satellite orbit information 310b is orbit data of each satellite, and is acquired by decoding the received satellite signal. In addition, the measurement information 310c includes information of a pseudo distance relating to the captured satellite, in addition to data of a Doppler frequency or a code phase relating to the captured satellite signal.

The position calculator 204 calculates the position or clock error of the GNSS receiver 10A by performing a position calculation process using the satellite orbit information 310b and the measurement information 310c. Specifically, the position and clock error of the GNSS receiver 10A are calculated by a position calculation process using a pseudo distance relating to the captured positioning satellite which is included in the measurement information 310c and the position of the captured positioning satellite which is included in the satellite orbit information 310b. In principle, when the pseudo distances and positions are obtained with respect to four or more positioning satellites, the position and clock error of the GNSS receiver 10A can be obtained. A known arithmetic operation method such as a least squares method or a Kalman filter can be applied to the position calculation process, and thus the detailed description thereof will not be given. The calculated position and clock error are stored as position calculation result information 312.

The location information acquisition unit 206 acquires location information which is support information from the external device 50 through the communication device 40 and the main processor 30 of the portable electronic device 1. The acquired location information is stored as acquired location information 306.

The satellite positioning system selector 208 selects a satellite positioning system used in positioning from a plurality of satellite positioning systems which are available to the GNSS receiver 10A. Specifically, in the region and satellite positioning system correspondence table 304 (see FIG. 2), a satellite positioning system which is availably associated with a region including a position indicated by the location information acquired by the location information acquisition unit 206 is selected as a satellite positioning system used in positioning. The system name, for example, of the selected satellite positioning system which serves as identification information is stored as selected satellite positioning system information 308.

The receiving operation controller 210A controls a receiving operation of the receiving circuit 102. Specifically, the operation state of a receiving circuit 102 corresponding to the satellite positioning system selected by the satellite positioning system selector 208 is set to be in an ON-state, and the operation states of the other receiving circuit 102 are set to be in an OFF-state.

The ON-state of the receiving circuit 102 is an operation state in which power is supplied from the battery 44 to the receiving circuit 102, and refers to a state of performing a circuit operation (receiving operation) in which the received signal based on the receiving antenna 100 is amplified or down-converted into a signal (IF signal) having an intermediate frequency, an unnecessary frequency component is cut off, or the received signal which is an analog signal is converted into a digital signal. In addition, the OFF-state is an operation state in which power is not supplied from the battery 44 to the receiving circuit 102, and refers to a state in which the above-mentioned circuit operation (receiving operation) is not performed.

The memory 300A is realized by a storage device such as a ROM or a RAM, stores a system program in order for the processor 200A to control the GNSS receiver 10A as a whole, a program and data for realizing various types of function, or the like, is used as the work area of the processor 200A, and temporarily stores arithmetic operation results of the processor 200A, received data from the external device 50, or the like. In the first example, the memory 300A stores a reception control program 302A, the region and satellite positioning system correspondence table 304, the acquired location information 306, the selected satellite positioning system information 308, the positioning information 310, and the position calculation result information 312.

The positioning information 310 is information relating to positioning performed in the GNSS receiver 10A, and includes a system name 310a serving as identification information of a satellite positioning system, the satellite orbit information 310b for each captured positioning satellite, and the measurement information 310c, for each satellite positioning system used positioning.

Flow of Processes

Figure 4:
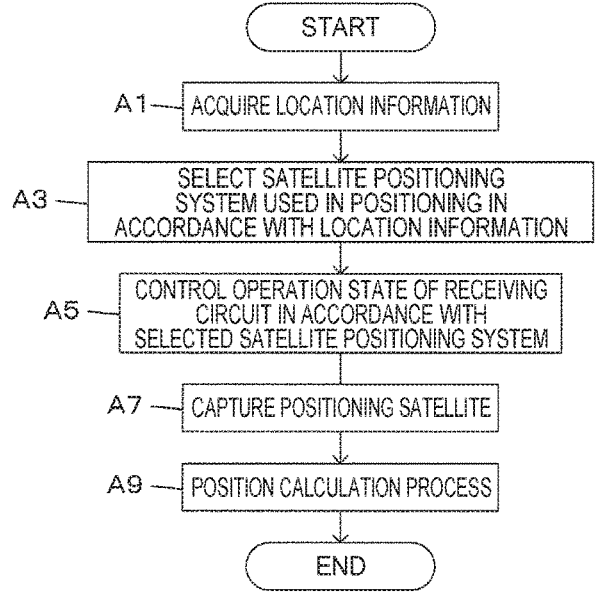
FIG. 4 is a flow diagram example of processes in the first example.

FIG. 4 is a flow diagram illustrating a flow of a reception control process in the first example. This process is realized by the processor 200A executing the reception control program 302A in the GNSS receiver 10A.

First, the location information acquisition unit 206 acquires location information which is support information from the external device 50 (step A1). Next, the satellite positioning system selector 208 selects a satellite positioning system associated with a position indicated by the acquired location information as a satellite positioning system used in positioning, in the region and satellite positioning system correspondence table 304 (step A3).

Subsequently, the receiving operation controller 210 sets a receiving circuit 102 corresponding to the satellite positioning system used in positioning to be in an ON-state, sets the other receiving circuit 102 to be in an OFF-state, and controls the operation state of the receiving circuit 102 so as to perform the receiving operation of satellite signals of only the satellite positioning system used in positioning (step A5).

The satellite capturing unit 202 captures positioning satellites (satellite signals) of a corresponding satellite positioning system, and acquires the satellite orbit information 310b or the measurement information 310c for each captured positioning satellite (step A7). In this case, a satellite positioning system corresponding to the receiving circuit 102 which is set to be in an ON-state, that is, only the positioning satellites (satellite signals) of the selected satellite positioning system used in positioning is captured. Thereafter, the position calculator 204 performs a position calculation process using the acquired satellite orbit information 310b and the measurement information 310c, and calculates the position or clock error of the GNSS receiver 10A (step A9). When the above-mentioned processes are performed, the reception control process is terminated.

According to the first example, information of a location at which the GNSS receiver 10A is located is at least included in the support information, and a satellite positioning system which is previously associated as a satellite positioning system available for positioning is selected at a position indicated by the location information. Thereby, an available satellite positioning system can be rapidly selected at the position of the GNSS receiver 10A.

Second Example

A second example is an example in which the external device 50 selects a satellite positioning system used in positioning on the basis of location information. Meanwhile, in the second example, the same components as those in the aforementioned first example are denoted by the same reference numerals and signs, and thus the detailed description thereof will not be given. Specifically, in the region and satellite positioning system correspondence table 304 (see FIG. 2), an external device 50B selects a satellite positioning system associated with the position of the external device 50B as a satellite positioning system used in positioning, and transmits the resultant to a GNSS receiver 10B, as satellite positioning system selection information.

Configuration

Figure 5:
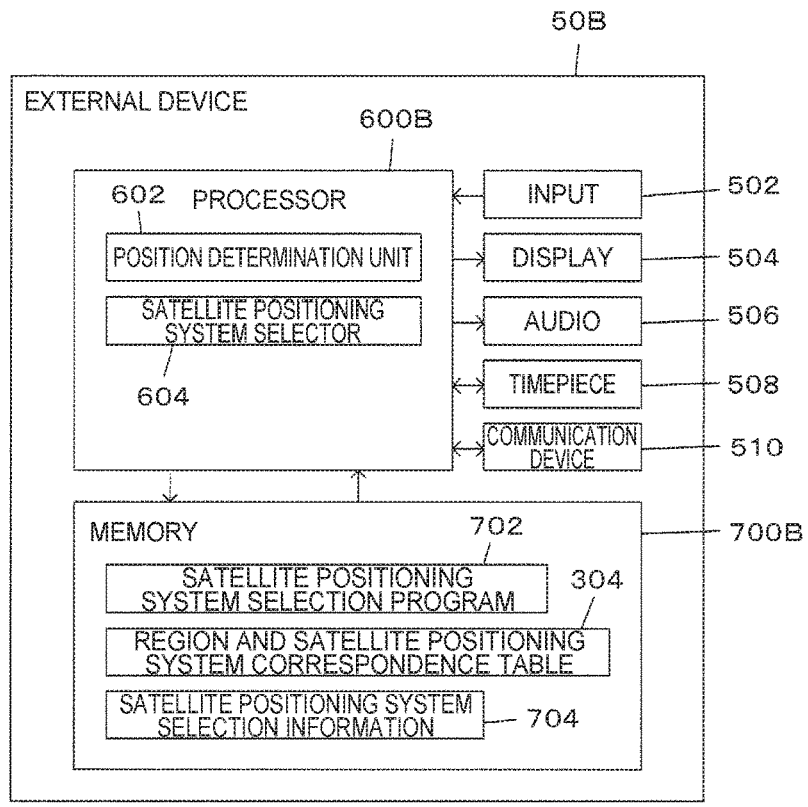
FIG. 5 is a diagram illustrating an internal configuration of an external device in a second example.

FIG. 5 is an internal configuration diagram of the external device 50B in the second example. According to FIG. 5, the external device 50B is configured to include an input 502, a display 504, an audio 506, a timepiece 508, a communication device 510, a processor 600B, and a memory 700B.

The input 502 is an input device which is constituted by a touch panel, a button switch or the like, and outputs an operation signal according to a user's operation to the processor 600B. The display 504 is a display device which is constituted by an LCD, a touch panel or the like, and performs various types of display based on a display signal from the processor 600B. The audio 506 is an audio device which is constituted by a speaker or the like, and outputs various types of audible information based on a audio signal from the processor 600B.

The timepiece 508 is an internal clock, is constituted by an oscillation circuit including a crystal oscillator or the like, and clocks a current time, an elapsed time from a designated timing, or the like. The communication device 510 is a communication device which is constituted by a near field communication module such as Bluetooth (Registered Trademark), and performs communication with other devices such as the portable electronic device 1.

The processor 600B is realized by a processor such as a CPU or a DSP, and controls each unit of the external device 50B as a whole. In the second example, the processor 600B includes a position determination unit 602 and a satellite positioning system selector 604.

The position determination unit 602 determines the position of the external device 50B. Specifically, for example, when the external device 50B is a cellular phone, service areas of cellular phone communication carriers in countries or regions are determined as positions. Alternatively, when a satellite positioning system can be used, the service areas are determined as positions obtained by positioning using the satellite positioning system.

The satellite positioning system selector 604 selects a satellite positioning system which is used in positioning by the GNSS receiver 10B. Specifically, a satellite positioning system associated with a region including the position of the external device 50B determined by the position determination unit 602 determined in the region and satellite positioning system correspondence table 304 (see FIG. 2) is selected. The selected satellite positioning system is transmitted to the portable electronic device 1, as satellite positioning system selection information 704.

The memory 700B is realized by a storage device such as ROM or a RAM, stores a system program in order for the processor 600B to control the external device 50B as a whole, a program or data for realizing various types of function, or the like, is used as the work area of the processor 600B, and temporarily stores arithmetic operation results of the processor 600B, received data from the portable electronic device 1, or the like. In the second example, the memory 700B stores a satellite positioning system selection program 702, the region and satellite positioning system correspondence table 304, and the satellite positioning system selection information 704.

Figure 6:
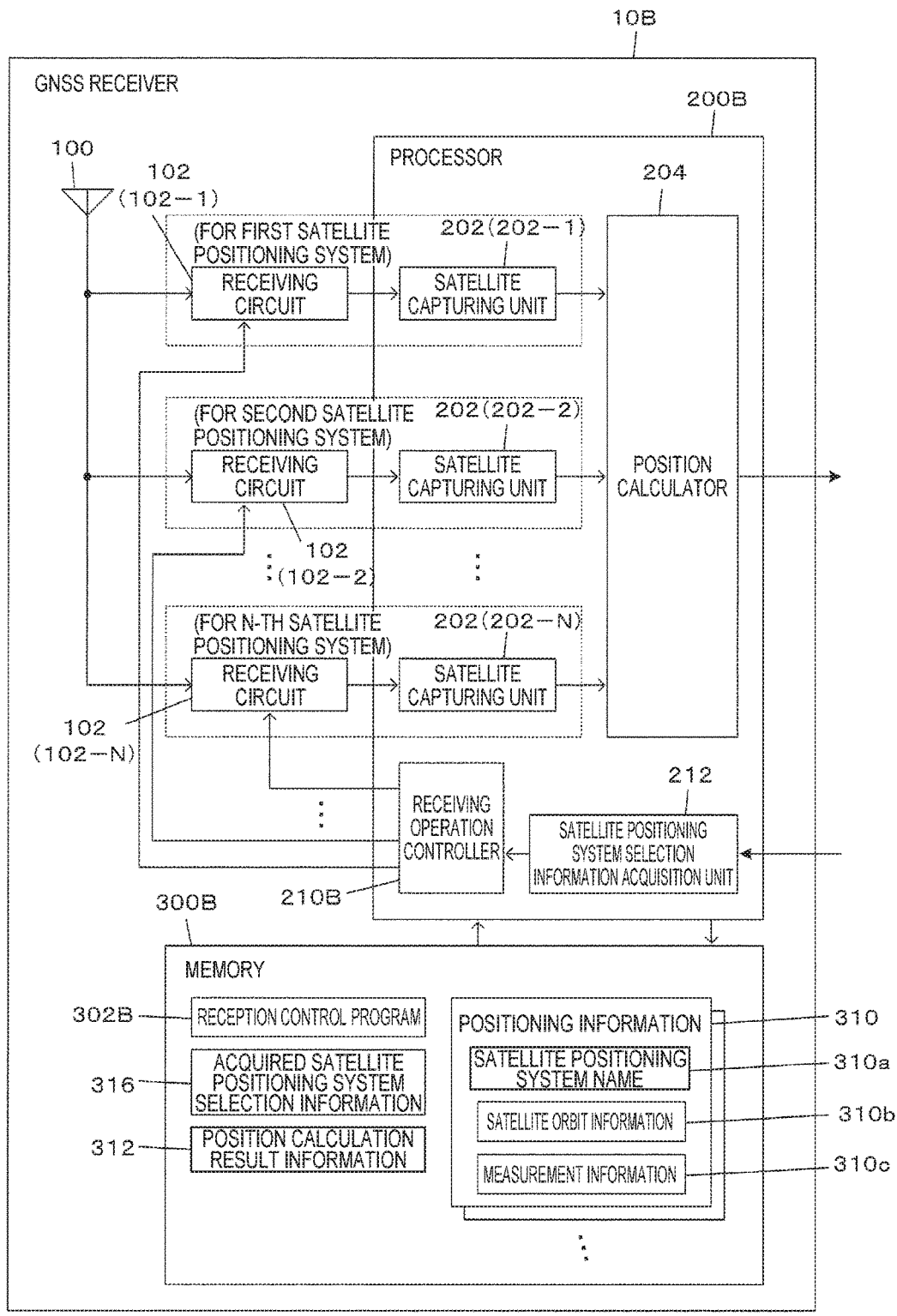
FIG. 6 is a diagram illustrating an internal configuration of a GNSS receiver in the second example.

FIG. 6 is an internal configuration diagram of the GNSS receiver 10B in the second example. As shown in FIG. 6, the GNSS receiver 10B includes a receiving antenna 100, a receiving circuit 102, a processor 200B, and a memory 300B.

In the second example, the processor 200B includes a satellite capturing unit 202, a position calculator 204, a satellite positioning system selection information acquisition unit 212, and a receiving operation controller 210B.

The satellite positioning system selection information acquisition unit 212 acquires satellite positioning system selection information, as support information, from the external device 50B. The acquired satellite positioning system selection information is stored as acquired satellite positioning system selection information 316.

The receiving operation controller 210B controls the operation state of the receiving circuit 102 so as to receive satellite signals of a satellite positioning system indicated by the acquired satellite positioning system selection information 316.

The memory 300B stores a reception control program 302B, the acquired satellite positioning system selection information 316, positioning information 310, and the position calculation result information 312.

Flow of Processes

Figure 7:
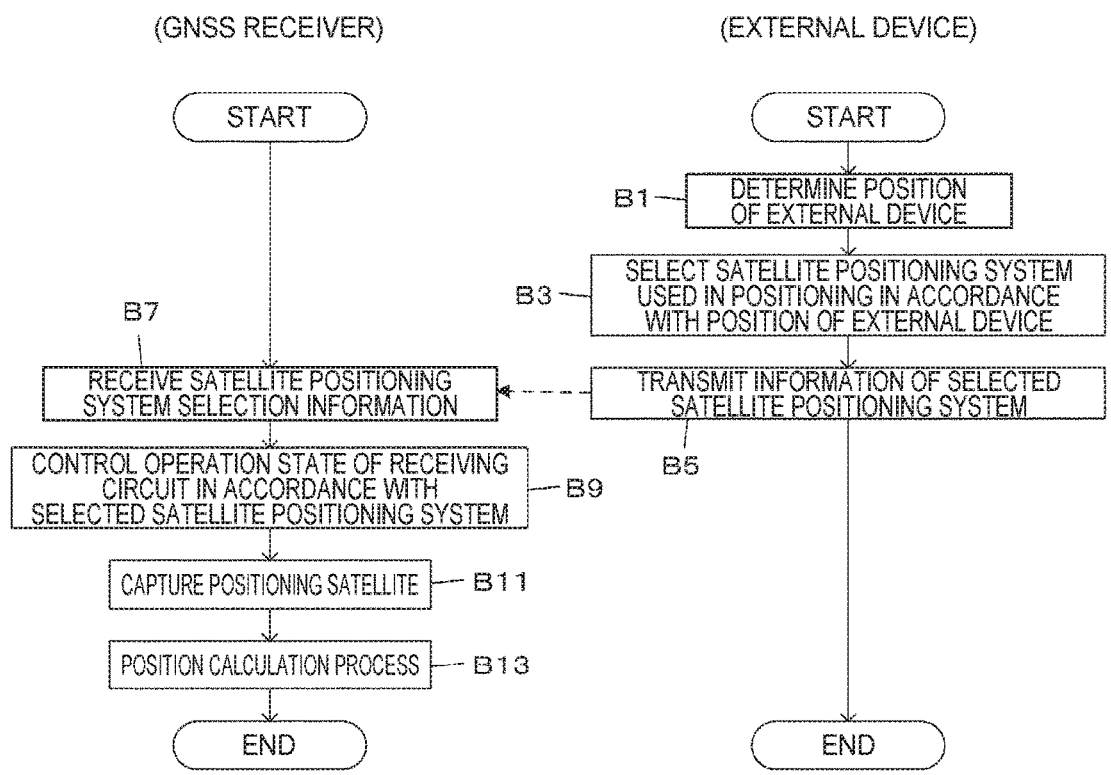
FIG. 7 is a flow diagram example of processes in the second example.

FIG. 7 is a flow diagram illustrating a flow of processes in the second example. In FIG. 7, an operation of the GNSS receiver 10B is shown on the left side, and an operation of the external device 50B is shown on the right side. This process is realized by the processor 200B executing the reception control program 302B in the GNSS receiver 10B, and the processor 600B executing the satellite positioning system selection program 702 in the external device 50B.

First, in the external device 50B, the position determination unit 602 determines the position of the external device 50B (step B1). Next, in the region and satellite positioning system correspondence table 304, the satellite positioning system selector 604 selects a satellite positioning system associated with the position of the external device 50B, as a satellite positioning system used in positioning (step B3). The selected satellite positioning system is transmitted to the portable electronic device 1 (GNSS receiver 10B), as the satellite positioning system selection information (step B5).

Then, in the GNSS receiver 10B, the satellite positioning system selection information acquisition unit 212 acquires (receives) the satellite positioning system selection information (step B7), and the receiving operation controller 210B controls the operation state of the receiving circuit 102 so as to receive satellite signals of a satellite positioning system indicated by the acquired satellite positioning system selection information (step B9). The satellite capturing unit 202 captures a positioning satellites (satellite signals) of a corresponding satellite positioning system, and acquires satellite orbit information 310b and measurement information 310c for each captured positioning satellite (step B11). Thereafter, the position calculator 204 performs a position calculation process using the acquired satellite orbit information 310b and the measurement information 310c, and calculates the position or clock error of the GNSS receiver 20 (step B13). When the above-mentioned processes are performed, the present process is terminated.

According to the second example, the support information includes at least information of a location at which the external device 50B is located which can be substituted as information of a location at which the GNSS receiver 10B is located, and a satellite positioning system which is previously associated as a satellite positioning system available for positioning is selected at a position indicated by the location information. Thereby, an available satellite positioning system can be rapidly selected at the position of the GNSS receiver 10B.

Third Example

A third example is an example in which support information acquired from an external device 50C by a GNSS receiver 100 is set to positioning collateral information when the external device 50C performs positioning. Meanwhile, in the third example, the same components as those in the aforementioned first and second examples are denoted by the same reference numerals and signs, and thus the detailed description thereof will not be given.

Specifically, the external device 50C can perform positioning based on a plurality of satellite positioning systems. Meanwhile, a satellite positioning system available to the external device 50C may not be the same as the satellite positioning system available to the GNSS receiver 100, and one or more types may be duplicated. The GNSS receiver 100 acquires the positioning collateral information relating to positioning performed by the surrounding external device 50C, as support information, from the external device 50C.

This positioning collateral information includes the number of positioning satellites, a satellite number, and orbit information which are captured during positioning, with respect to each satellite positioning system used in positioning by the external device 50C.

The GNSS receiver 100 sets the order of priority for making an attempt at positioning in available satellite positioning systems, on the basis of the acquired positioning collateral information. Specifically, the order of priority is set in each combination of one or a plurality of satellite positioning systems concurrently available which are specified in the GNSS receiver 100, in accordance with the number of satellites captured for each satellite positioning system and the remaining battery level of the battery 44. In this case, the total sum of the numbers of satellites captured of the respective satellite positioning systems is used with respect to combinations which are created by a plurality of satellite positioning systems. Meanwhile, the number of satellites captured can also be calculated from the satellite number or the orbit information. Therefore, when at least one of the number of positioning satellites captured, the satellite number, and the orbit information is included in the positioning collateral information, the order of priority can be set.

FIGS. 8A and 8C are an example in which the order of priority is set. FIG. 8A is the number of satellites captured for each satellite positioning system which is the positioning collateral information. FIGS. 8B and 8C are the order of priority which is set with respect to combinations of satellite positioning systems concurrently available in the GNSS receiver 10C. FIG. 8B shows the order of priority when the remaining battery level of the battery 44 is "high", and FIG. 8C shows the order of priority when the remaining battery level thereof is "low". Meanwhile, the degree of the remaining battery level can be determined whether the remaining battery level is equal to or greater than a predetermined threshold.

As shown in FIG. 8B, when the remaining battery level is "high", the order of priority is set in descending order of the number of satellites captured, with respect to each combination of satellite positioning systems. On the other hand, as shown in FIG. 8C, when the remaining battery level is "low", first, the order of priority is set in descending order of the number of satellites captured by prioritizing combinations which are created by one satellite positioning system and of which the number of satellites captured is a predetermined number ("8" in FIG. 8A to 8C) or greater among the combinations of satellite positioning systems. Thereafter, the order of priority is set in descending order of the number of satellites captured with respect to the remaining combinations.

When the order of priority is set in this manner, the GNSS receiver 10C selects satellite positioning systems in descending order of priority, and makes an attempt at positioning.

Configuration

Figure 9:
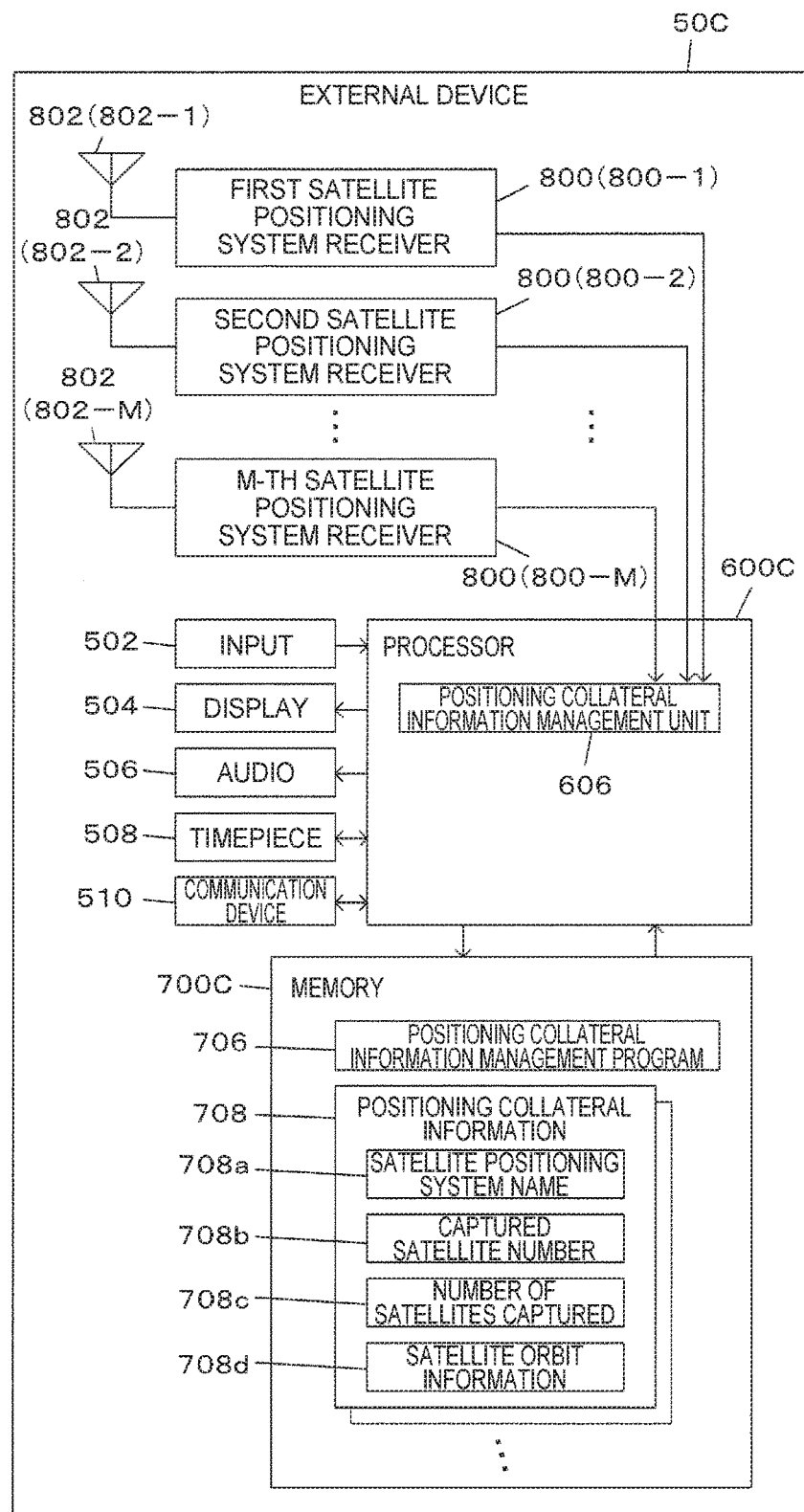
FIG. 9 is a diagram illustrating an internal configuration of an external device in the third example.

FIG. 9 is an internal configuration diagram of the external device 50C in the third example. According to FIG. 9, the external device 50C is configured to include a satellite positioning system receiver 800, an input 502, a display 504, an audio 506, a timepiece 508, a communication device 510, a processor 600C, and a memory 700C.

The satellite positioning system receiver 800 is constituted by M satellite positioning system receivers 800-1 to 800-M corresponding to a plurality of satellite positioning systems, respectively, which are available to the external device 50C, and includes a receiving antenna 802 capable of receiving each signal having a carrier frequency of a satellite signal of a corresponding satellite positioning system. The satellite positioning system receiver 800 performs a positioning process based on the satellite signals received in the receiving antenna 802, and calculates the position or clock error of the satellite positioning system receiver 800 (external device 50C).

In the third example, the processor 600C includes a positioning collateral information management unit 606.

The positioning collateral information management unit 606 manages positioning collateral information 708 when the external device 50C performs positioning. Specifically, whenever positioning is performed, the satellite number, the orbit information or the like of the captured positioning satellite (captured satellite) is acquired from each of the corresponding satellite positioning system receivers 800, and is stored as the positioning collateral information 708.

The positioning collateral information 708 stores a system name 708a serving as identification information of a satellite positioning system, a satellite number 708b serving as identification information of a positioning satellite captured during latest positioning, the number of captured satellites 708c, and orbit information 708d for each captured satellite, for each satellite positioning system which is used in positioning by the external device 50C.

A memory 300C stores a positioning collateral information management program 706 and the positioning collateral information 708.

Figure 10:
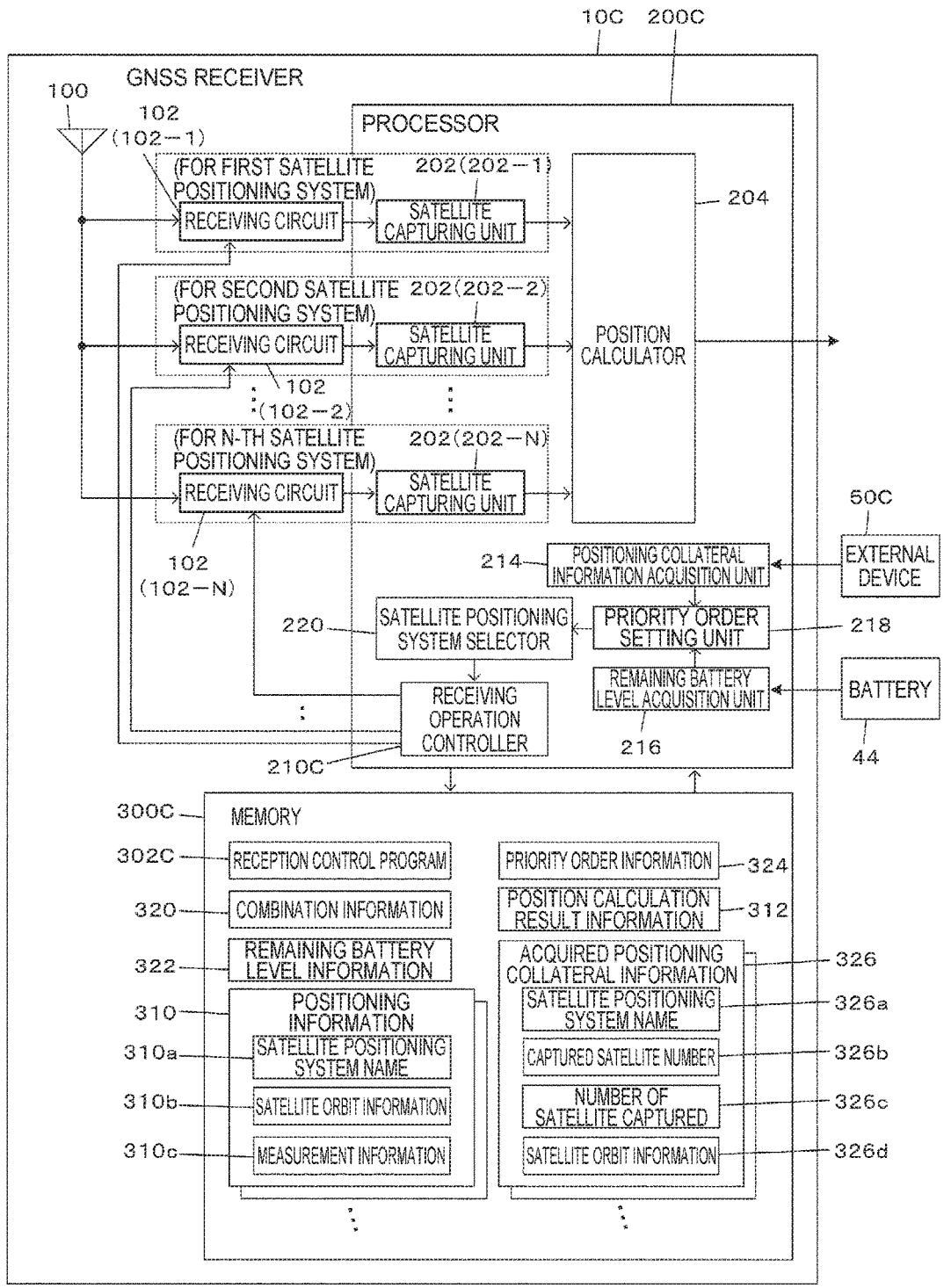
FIG. 10 is a diagram illustrating an internal configuration of a GNSS receiver in the third example.

FIG. 10 is an internal configuration diagram of the GNSS receiver 100 in the third example. The GNSS receiver 100 is configured to include N receiving circuit 102-1 to 102-N corresponding to a plurality of satellite positioning systems, respectively, which are available to the GNSS receiver 100, a processor 200C, and the memory 300C.

In the third example, the processor 200C includes a satellite capturing unit 202, a position calculator 204, a positioning collateral information acquisition unit 214, a remaining battery level acquisition unit 216, a priority order setting unit 218, a satellite positioning system selector 220, and a receiving operation controller 210C.

The positioning collateral information acquisition unit 214 acquires positioning collateral information which is support information from the external device 50C. The acquired positioning collateral information is stored as acquired positioning collateral information 326.

The remaining battery level acquisition unit 216 acquires the remaining battery level of the battery 44. The acquired remaining battery level is stored as remaining battery level information 322.

The priority order setting unit 218 sets the order of priority for each combination of satellite positioning systems which are concurrently available to the GNSS receiver 10C, on the basis of the number of captured satellites 326c for each satellite positioning system included in the acquired positioning collateral information 326 and the remaining battery level of the battery 44. That is, the total sum of the numbers of satellites captured of the respective combinations of satellite positioning systems is obtained. When the remaining battery level is "high", the order of priority is set in descending order of the number of satellites captured (see FIG. 8B). When the remaining battery level is "low", first, the order of priority is set in descending order of the number of satellites captured with respect to combinations of which the number of satellites captured is equal to or greater than a predetermined number. Subsequently, the order of priority is set in descending order of the number of satellites captured with respect to the other combinations (see FIG. 8C).

The combinations of satellite systems which are concurrently available to the GNSS receiver 20 are stored as combination information 320. In addition, the set order of priority is stored as priority order information 324.

The satellite positioning system selector 220 selects satellite positioning systems used in positioning, in accordance with the order of priority which is set in the priority order setting unit 218. That is, first, a combination of which the order of priority is highest is selected as a satellite positioning system used in positioning. When positioning using this satellite positioning system fails to be performed, a combination of which the order of priority is second highest is newly selected as a satellite positioning system used in positioning. In this manner, until positioning is performed successfully, repetition is performed on the selection of one combination as a satellite positioning system used in positioning in accordance with the order of priority.

The memory 300C stores a reception control program 302C, the combination information 320, the remaining battery level information 322, the priority order information 324, positioning information 310, position calculation result information 312, and the acquired positioning collateral information 326.

Flow of Processes

Figure 11:
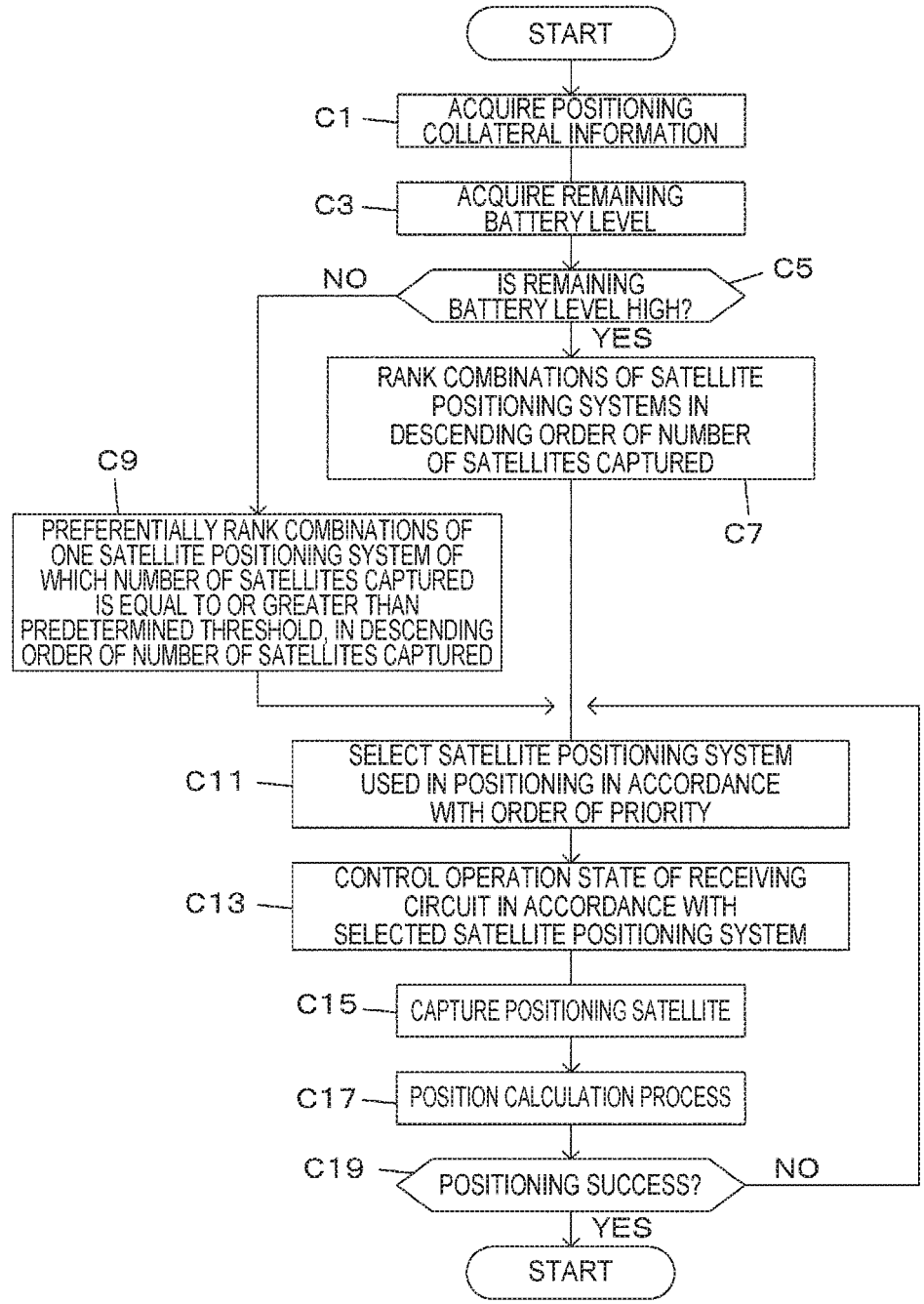
FIG. 11 is a flow diagram example of processes in the third example.

FIG. 11 is a flow diagram illustrating a flow of a reception control process in the third example. This process is realized by the processor 200C executing the reception control program 302C in the GNSS receiver 10C.

First, the positioning collateral information acquisition unit 214 acquires positioning collateral information which is support information from the external device 50C (step C1). In addition, the remaining battery level acquisition unit 216 acquires the remaining battery level of the battery 44 (step C3).

Subsequently, the priority order setting unit 218 sets the order of priority in the combinations of satellite positioning systems specified to be concurrently available to the GNSS receiver 10C, on the basis of the acquired positioning collateral information and the remaining battery level. That is, the degree of the remaining battery level is determined by whether the remaining battery level is equal to or greater than a predetermined threshold, and when the remaining battery level is high (step C5: YES), the combinations of satellite positioning systems are ranked in descending order of the number of satellites captured (step C7). On the other hand, when the remaining battery level is low (step C5: NO), the combinations which are created by one positioning satellite system and of which the number of satellites captured is equal to or greater than a predetermined threshold are preferentially ranked in descending order of the number of satellites captured (step C9).

Next, the satellite positioning system selector 220 selects one combination as a satellite positioning system used in positioning, in accordance with the set order of priority (step C11). Subsequently, the receiving operation controller 210 controls the operation state of the receiving circuit 102 so as to perform the receiving operation of satellite signals of only the satellite positioning system used in positioning (step C13). The satellite capturing unit 202 captures positioning satellites (satellite signals) of a corresponding satellite positioning system, and acquires the satellite orbit information 310*b* and the measurement information 310*c* for each captured positioning satellite (step C15). Thereafter, the position calculator 204 performs a position calculation process using the acquired satellite orbit information 310*b* and the measurement information 310*c* (step C17).

As a result, when the calculation of the position or clock error fails to be performed (step C19: NO), the process returns to step C11, a combination of satellite positioning systems having the next order of priority is selected (step C11), and the same process is performed. When the position or clock error is calculated successfully (step C19: YES), the present process is terminated.

As described above, according to the third example, the positioning collateral information when the external device 50C capable of performing positioning based on a plurality of satellite positioning systems performs a positioning process is acquired as the support information. Thereby, for example, the external device 50C selects a satellite positioning system used in positioning, and thus it is possible to rapidly select an appropriate satellite positioning system.

Fourth Example

A fourth example is an example in which an external device 50D performs the setting of the order of priority of positioning satellite systems used in positioning based on the positioning collateral information. Meanwhile, in the fourth example, the same components as those in the aforementioned first to third examples are denoted by the same reference numerals and signs, and thus the detailed description thereof will not be given.

Specifically, the external device 50D acquires the remaining battery level of the battery 44, and the combinations of satellite positioning systems which are concurrently available to a GNSS receiver 10D, from the portable electronic device 1 (GNSS receiver 10D). The order of priority for each acquired combination of satellite positioning systems is set on the basis of the number of satellites captured for each satellite positioning system during positioning performed by the external device 50D, and the acquired remaining battery level, and is transmitted to the portable electronic device 1, as priority order information.

Configuration

Figure 12:
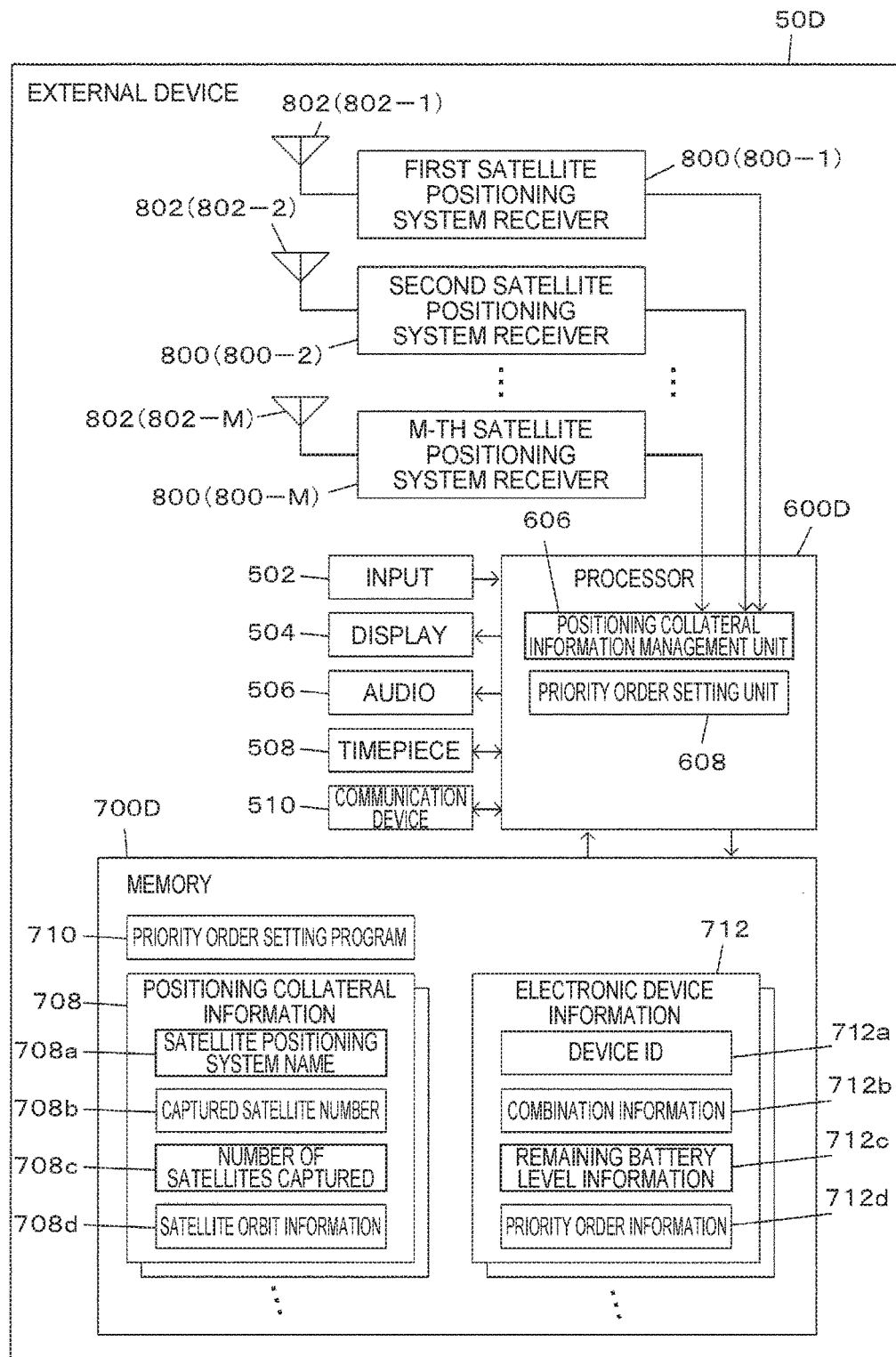
FIG. 12 is a diagram illustrating an internal configuration of an external device in a fourth example.

FIG. 12 is an internal configuration diagram of the external device 50D in the fourth example. According to FIG. 12, the external device 50D is configured to include satellite positioning system receivers 800-1 to 800-M for each of a plurality of satellite positioning systems which are available to the external device 50D, an input 502, a display 504, an audio 506, a timepiece 508, a communication device 510, a processor 600D, and a memory 700D.

In the fourth example, the processor 600D includes a positioning collateral information management unit 606 and a priority order setting unit 608.

The priority order setting unit 608 sets the order of priority for each combination of satellite positioning systems capable of concurrently performing receiving operations in the GNSS receiver 10D. Specifically, information of the remaining battery level of the battery 44 and information of combinations of satellite positioning systems capable of concurrently performing receiving operations in the GNSS receiver 10D are acquired from the GNSS receiver 10D, and the order of priority is set for each acquired combination of satellite positioning systems on the basis of the acquired remaining battery level, and the number of satellites captured for each satellite positioning system captured by the external device 50D. The set order of priority is transmitted to the GNSS receiver 10D, as the priority order information.

Here, the number of satellites captured for each satellite positioning system is stored as the positioning collateral information 708. In addition, the information relating to the GNSS receiver 10D in which the order of priority is set is stored as electronic device information 712.

The electronic device information 712 is generated for each GNSS receiver 10D, and stores a device ID 712a which is identification information of the GNSS receiver 10D, combination information 712b, remaining battery level information 712c, and priority order information 712d.

The memory 300D stores a priority order setting program 710, the positioning collateral information 708, and the electronic device information 712.

Figure 13:
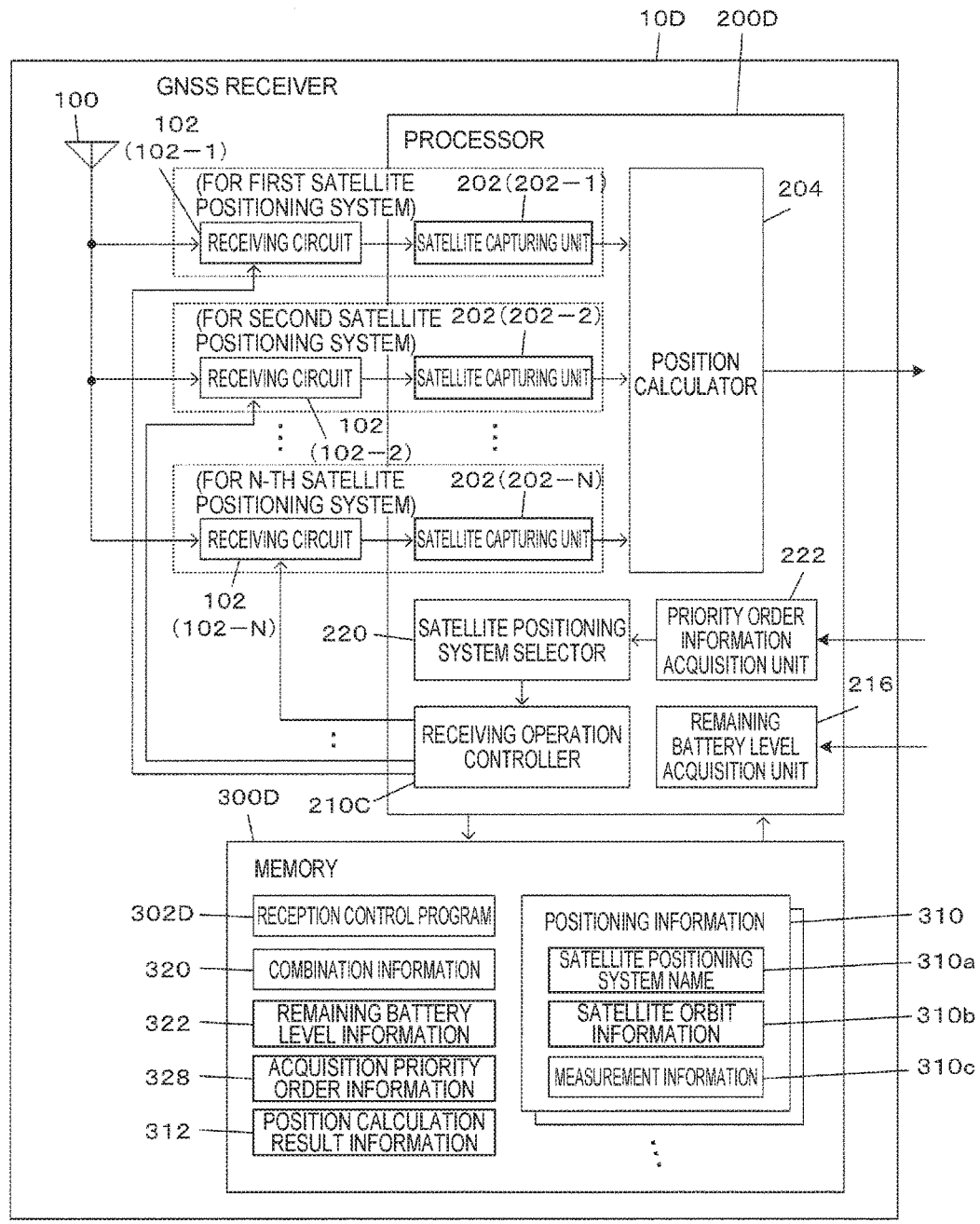
FIG. 13 is a diagram illustrating an internal configuration of a GNSS receiver in the fourth example.

FIG. 13 is an internal configuration diagram of the GNSS receiver 10D in the fourth example. The GNSS receiver 10D is configured to include N receiving circuit 102-1 to 102-N corresponding to a plurality of satellite positioning systems, respectively, which are available to the GNSS receiver 10D, a processor 200D, and a memory 300D. In the fourth example, the processor 200D includes a satellite capturing unit 202, a position calculator 204, a priority order information acquisition unit 222, a remaining battery level acquisition unit 216, a satellite positioning system selector 220, and a receiving operation controller 210C.

The priority order information acquisition unit 222 transmits the remaining battery level information 322 and the combination information 320 to the external device 50D, and acquires priority order information for this combination from the external device 50D. The acquired priority order information is stored as acquisition priority order information 328.

The satellite positioning system selector 220 selects satellite positioning systems used in positioning, in accordance with the order of priority indicated by the acquisition priority order information 328.

The memory 300D stores a reception control program 302D, the combination information 320, the remaining battery level information 322, the acquisition priority order information 328, the positioning information 310, and the position calculation result information 312.

Flow of Processes

Figure 14:
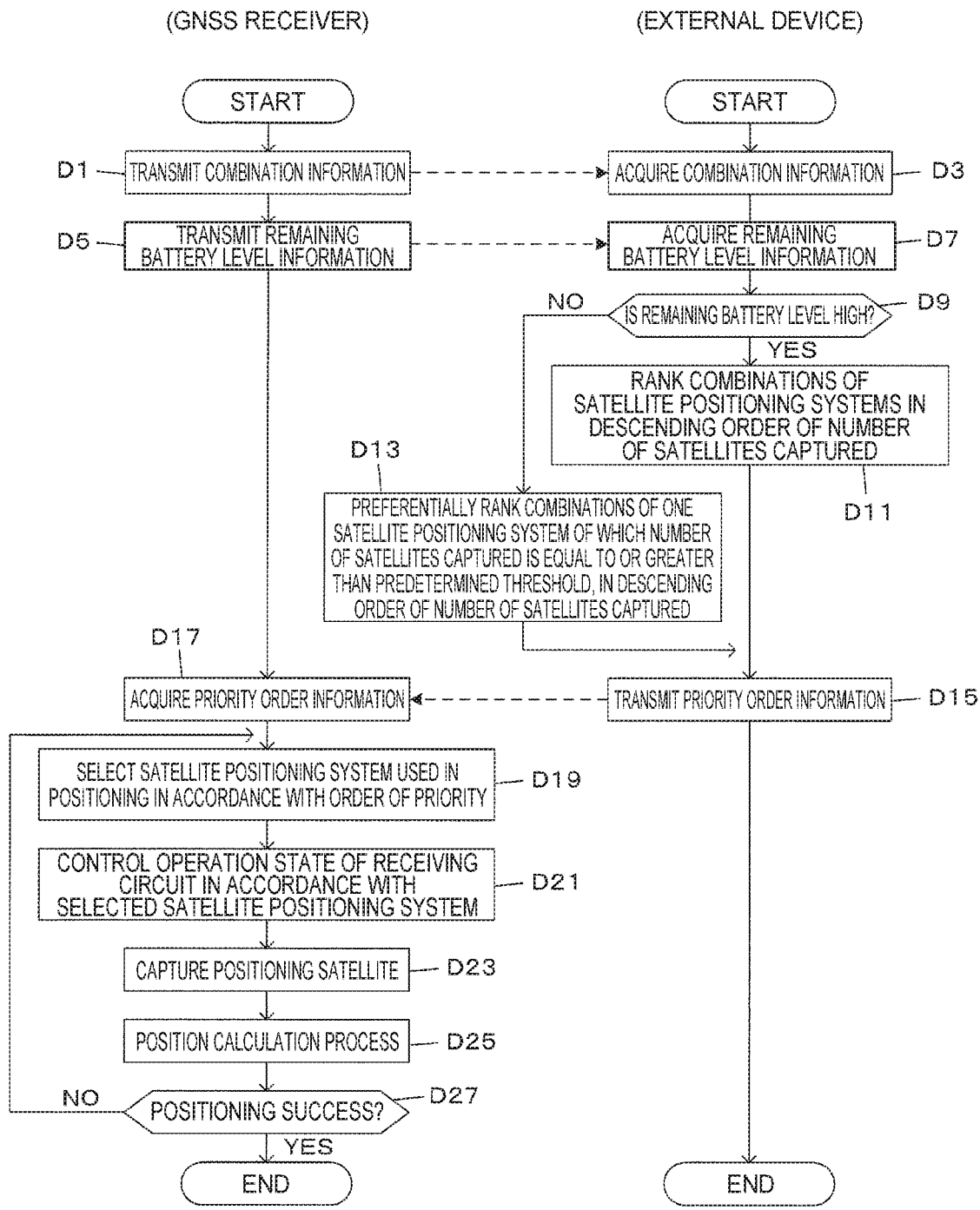
FIG. 14 is a flow diagram example of processes in the fourth example.

FIG. 14 is a flow diagram illustrating a flow of processes in the fourth example. In FIG. 14, an operation of the GNSS receiver 10D is shown on the left side, and an operation of the external device 50D is shown on the right side. This process is realized by the processor 200D executing the reception control program 302D in the GNSS receiver 10D, and the processor 600D executing the priority order setting program 710 in the external device 50D.

First, in the GNSS receiver 10D, the priority order information acquisition unit 222 transmits the combination information 320 of satellite positioning systems which are concurrently available and the remaining battery level information 322 of the battery 44 to the external device 50 (steps D1 and D5).

In the external device 50D, when the combination information 320 and the remaining battery level information 322 are acquired from the portable electronic device 1 (steps D3 and D7), the priority order setting unit 608 sets the order of priority in each acquired combination of satellite positioning systems, on the basis of the positioning collateral information 708 of the external device 50D and the acquired remaining battery level. That is, the degree of the remaining battery level is determined by whether the remaining battery level is equal to or greater than a predetermined threshold, and when the remaining battery level is high (step D9: YES), the combinations of satellite positioning systems are ranked in descending order of the number of satellites captured (step D11). On the other hand, when the remaining battery level is low (step D9: NO), the combinations which are created by one positioning satellite system and of which the number of satellites captured is equal to or greater than a predetermined threshold are preferentially ranked in descending order of the number of satellites captured (step D13). The set order of priority is transmitted to the GNSS receiver 10D, as the priority order information (step D15).

In the GNSS receiver 10D, when the priority order information acquisition unit 222 acquires the priority order information 324 (receives) (step D17), the satellite positioning system selector 220 selects one combination as a satellite positioning system used in positioning, in accordance with the order of priority indicated by the acquired priority order information (step D19). Subsequently, the receiving operation controller 210 controls the operation state of the receiving circuit 102 so as to receive only satellite signals of a satellite positioning system used in positioning (step D21). The satellite capturing unit 202 captures positioning satellites (satellite signals) of a corresponding satellite positioning system, and acquires the satellite orbit information 310b and the measurement information 310c for each captured positioning satellite (step D23). Thereafter, the position calculator 204 performs a position calculation process using the acquired satellite orbit information 310b and the measurement information 310c (step D25).

As a result, when the calculation of the position or clock error fails to be performed (step D27: NO), the process returns to step D19, a combination of satellite positioning systems having the next order of priority is selected (step D19), and the same process is performed. When the position or clock error is calculated successfully (step D27: YES), the present process is terminated.

As described above, according to the fourth example, the positioning collateral information when the external device 50D capable of performing positioning based on a plurality of satellite positioning systems performs a positioning process is acquired as the support information. Thereby, for example, the external device 50D selects a satellite positioning system used in positioning, and thus it is possible to rapidly select an appropriate satellite positioning system.

Operational Effect

Although the first to fourth examples have been described, according to the present embodiment as described above, the GNSS receiver 10 capable of using a plurality of satellite positioning systems can appropriately and rapidly select a satellite positioning system used in positioning on the basis of the support information acquired from the external device 50. Specifically, for example, in the first example or the second example, it is possible to select a satellite positioning system associated so as to be available at the location of the GNSS receiver 10. In addition, in the third example or the fourth example, the GNSS receiver 10 can select a satellite positioning system used in positioning, in accordance with the order of priority based on the number of satellites captured for each satellite positioning system which is positioning collateral information during positioning performed by the external device 50 capable of using a plurality of satellite positioning systems.

Modification Example

Meanwhile, the embodiment to which the present disclosure can be applied is not limited to the aforementioned embodiment, and can be of course changed appropriately without departing from the spirit and scope of the present disclosure.

(A) Selection of Satellite Positioning System

For example, the GNSS receiver 10 may select a satellite positioning system based on the positioning collateral information acquired from the external device 50, and may select a satellite positioning system of the positioning collateral information, that is, a satellite positioning system used in positioning in the external device 50, as a satellite positioning system which is used in positioning.

(B) Use of Acquired Positioning Collateral Information

In addition, in the third example, the GNSS receiver 10C may perform positioning using the positioning collateral information 326 acquired from the external device 50C as so-called assist data. That is, all the positioning satellites of the selected satellite positioning system are not set to search targets, and only a positioning satellite indicated by a captured satellite number 326b included in the positioning collateral information 326 corresponding to the selected satellite positioning system is set to a search target to perform positioning. In addition, satellite orbit information 326d of a captured satellite included in the positioning collateral information 326 is used, and thus it is possible to rapidly capture a positioning satellite which is a search target. Further, in the fourth example, the GNSS receiver 10D also acquires positioning collateral information from the external device 50D, and positioning may be similarly performed using this positioning collateral information as assist data.

What is claimed is:

1. A method for causing a processor to execute computer-readable instructions stored in a memory provided in a positioning device, the method comprising executing the computer-readable instructions on the processor the steps of:
    acquiring support information from an external device, the support information including:
        identification information of a plurality of satellite positioning systems used by the external device; and
        identification information of at least some of a plurality of satellites captured by each of the plurality of satellite positioning systems used by the external device;
    detecting a battery level of a battery in the positioning device, the battery supplying power to the positioning device;
    selecting at least one of the plurality of satellite positioning systems based on the battery level and the support information;
    receiving satellite signals from the some of the plurality of satellites associated with the selected at least one of the plurality of satellite positioning systems; and
    setting an order of priority for selecting one or a combination of two of the plurality of satellite positioning systems,
    wherein when the battery level is equal to or more than a threshold, a highest rank in the order of the priority is a largest number of the plurality of satellites captured by the one or the combination of two of the plurality of satellite positioning systems, and
    the processor is configured to select at least one of the plurality of satellite positioning systems corresponding to the highest rank.

2. The selection method according to claim 1,
    wherein the support information further includes information of a location at which the positioning device is located, and
    each of the plurality of satellite positioning systems corresponds a specific region so that one of the plurality of satellite positioning systems corresponding the location of the positioning device is selected in the selecting.

3. The selection method according to claim 1,
    setting an order of priority for selecting one or a combination of two of the plurality of satellite positioning systems,
    wherein when the battery level is less than a threshold, a highest rank in the order of the priority is a largest number of the plurality of satellites associated with only one of the plurality of satellite positioning systems and the largest number is more than a predetermined number, and
    the processor is configured to select only one of the plurality of satellite positioning systems corresponding to the highest rank.

4. The selection method according to claim 1,
    wherein the support information further includes:
        a number of the plurality of satellites captured by each of the plurality of satellite positioning systems used by the external device; and
        orbit information of the some of the plurality of satellites captured by each of the plurality of satellite positioning systems used by the external device.

5. A positioning device comprising:
    a memory that is configured to store computer-readable instructions and data corresponding to a plurality of satellite positioning systems;
    a receiver that is configured to receive a locational signal from at least one of a plurality of satellites so as to determine a location of the positioning device;
    a battery that is configured to supply power to the positioning device; and
    a processor that is configured to execute the computer-readable instructions so as to:
        acquire support information from an external device, the support information including:
            identification information of the plurality of satellite positioning systems used by the positioning device; and
            identification information of at least some of the plurality of satellites captured by each of the plurality of satellite positioning systems used by the external device;
        detect a battery level of a battery in the positioning device, the battery supplying power to the positioning device;
        select at least one of the plurality of satellite positioning systems based on the battery level and the support information; and
        receive satellite signals from the some of the plurality of satellites associated with the selected at least one of the plurality of satellite positioning systems,
    wherein the processor is configured to set an order of priority for selecting one or a combination of two of the plurality of satellite positioning systems,
    when the battery level is equal to or more than a threshold, a highest rank in the order of the priority is a largest number of the plurality of satellites captured by the one or the combination of two of the plurality of satellite positioning systems, and
    the processor is configured to select at least one of the plurality of satellite positioning systems corresponding to the highest rank.

6. The positioning device according to claim 5,
    wherein the support information further includes information of the location of the positioning device, and each of the plurality of satellite positioning systems corresponds a specific region so that one of the plurality of satellite positioning systems corresponding the location of the positioning device is selected in the selecting.

7. The positioning device according to claim 5,
wherein the processor is configured to set an order of priority for selecting one or a combination of two of the plurality of satellite positioning systems,
when the battery level is less than a threshold, a highest rank in the order of the priority is a largest number of the plurality of satellites associated with only one of the plurality of satellite positioning systems and the largest number is more than a predetermined number, and
the processor is configured to select only one of the plurality of satellite positioning systems corresponding to the highest rank.

8. The positioning device according to claim 5,
wherein the support information further includes:
 a number of the plurality of satellites captured by each of the plurality of satellite positioning systems used by the external device; and
 orbit information of the some of the plurality of satellites captured by each of the plurality of satellite positioning systems used by the external device.

9. A computer program product embodying computer-readable instructions stored on a non-transitory computer-readable medium for causing a computer to execute the computer-readable instructions on a processor so as to perform the steps of:
 acquiring support information from an external device, the support information including:
  identification information of a plurality of satellite positioning systems used by the external device; and
  identification information of at least some of a plurality of satellites captured by each of the plurality of satellite positioning systems used by the external device;
 detecting a battery level of a battery in the positioning device, the battery supplying power to the positioning device;
 selecting at least one of the plurality of satellite positioning systems based on the battery level and the support information;
 receiving satellite signals from the some of the plurality of satellites associated with the selected at least one of the plurality of satellite positioning systems; and
 setting an order of priority for selecting one or a combination of two of the plurality of satellite positioning systems by causing the computer to execute the computer-readable instructions on the processor,
wherein when the battery level is equal to or more than a threshold, a highest rank in the order of the priority is a largest number of the plurality of satellites captured by the one or the combination of two of the plurality of satellite positioning systems, and
the processor is configured to select at least one of the plurality of satellite positioning systems corresponding to the highest rank.

10. The computer program product according to claim 9,
wherein the support information further includes information of a location at which the positioning device is located, and
each of the plurality of satellite positioning systems corresponds a specific region so that one of the plurality of satellite positioning systems corresponding the location of the positioning device is selected in the selecting.

11. The computer program product according to claim 9, further including:
setting an order of priority for selecting one or a combination of two of the plurality of satellite positioning systems by causing the computer to execute the computer-readable instructions on the processor,
wherein when the battery level is less than a threshold, a highest rank in the order of the priority is a largest number of the plurality of satellites associated with only one of the plurality of satellite positioning systems and the largest number is more than a predetermined number, and
the processor is configured to select only one of the plurality of satellite positioning systems corresponding to the highest rank.

12. The computer program product according to claim 9,
wherein the support information further includes:
 a number of the plurality of satellites captured by each of the plurality of satellite positioning systems used by the external device; and
 orbit information of the some of the plurality of satellites captured by each of the plurality of satellite positioning systems used by the external device.

\* \* \* \* \*